US012086934B2

(12) United States Patent
Astvatsaturov et al.

(10) Patent No.: US 12,086,934 B2
(45) Date of Patent: Sep. 10, 2024

(54) SYSTEMS AND METHODS FOR ASSESSING TRAILER UTILIZATION

(71) Applicant: ZEBRA TECHNOLOGIES CORPORATION, Lincolnshire, IL (US)

(72) Inventors: Yuri Astvatsaturov, Lake Forest, IL (US); Seth David Silk, Barrington, IL (US); Justin F. Barish, Kings Park, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 97 days.

(21) Appl. No.: 17/957,784

(22) Filed: Sep. 30, 2022

(65) Prior Publication Data

US 2024/0112402 A1    Apr. 4, 2024

(51) Int. Cl.
*G06T 17/10*    (2006.01)
*G06T 7/62*    (2017.01)
*G06V 10/764*    (2022.01)

(52) U.S. Cl.
CPC ............. *G06T 17/10* (2013.01); *G06T 7/62* (2017.01); *G06V 10/764* (2022.01);
(Continued)

(58) Field of Classification Search
CPC ....... G06T 17/10; G06T 7/62; G06T 2200/04; G06T 2200/24; G06T 2210/56; G06V 10/764

See application file for complete search history.

(56) References Cited

U.S. PATENT DOCUMENTS 11,094,135 B1 *   8/2021  Palmer .................... G06F 3/167
11,222,486 B1 *   1/2022  Subramanian .......... G07C 5/08
(Continued)

FOREIGN PATENT DOCUMENTS

CN          110473291 A  * 11/2019  .......... G06K 9/3233
WO    WO-2022138715 A1 *  6/2022

OTHER PUBLICATIONS

Kamari M, Ham Y. Vision-based volumetric measurements via deep learning-based point cloud segmentation for material management in jobsites. Automation in Construction. Jan. 1, 2021;121:103430.*

(Continued)

*Primary Examiner* — Sarah Lhymn (57) ABSTRACT

Systems and methods for assessing trailer utilization are disclosed herein. The method generates a trailer interior map and captures an image of the trailer interior. The map includes first voxels associated with the trailer interior and the image includes a plurality of three-dimensional (3D) image data points. The method generates a 3D map of an object based on a set of 3D points indicative of respective 3D image data points corresponding to respective first voxels and determines whether the object is non-conforming. The method determines at least one of second voxels associated with unusable space proximate to a non-conforming object, third voxels associated with the non-conforming object, and fourth voxels associated with a conforming object. The method determines an occupied portion of the trailer based on the first voxels, third voxels, and fourth voxels and trailer utilization based on the occupied portion of the trailer, the first voxels, and the second voxels.

17 Claims, 9 Drawing Sheets

(52) U.S. Cl.
CPC ...... *G06T 2200/04* (2013.01); *G06T 2200/24* (2013.01); *G06T 2210/56* (2013.01)

(56) References Cited

U.S. PATENT DOCUMENTS

| | | | | |
|---|---|---|---|---|
| 2016/0239790 A1* | 8/2016 | Burch, V | ............. | G06Q 10/083 |
| 2016/0239801 A1* | 8/2016 | Burch, V | ........... | G06Q 10/0838 |
| 2019/0155302 A1* | 5/2019 | Lukierski | ............. | G05D 1/0251 |
| 2019/0346167 A1* | 11/2019 | Boyd | .................... | G01B 11/00 |
| 2020/0034790 A1* | 1/2020 | Millhouse | ........ | G06Q 10/06313 |
| 2020/0074609 A1* | 3/2020 | Kotila | .................... | B22F 12/90 |
| 2020/0302207 A1* | 9/2020 | Perkins | ................ | G06V 10/764 |
| 2020/0356350 A1* | 11/2020 | Penland | .................... | G06F 8/34 |
| 2022/0076019 A1* | 3/2022 | Moulon | ............. | G05D 1/0238 |
| 2022/0388525 A1* | 12/2022 | Roberts | ................ | B60W 50/12 |

OTHER PUBLICATIONS

"Load Volume Measurements", SICK Germany (Jun. 5, 2021), available at: https://cdn.sickcn.com/media/docs/5/25/325/addendum_to_operating_instructions_load_volume_measurement_system_profiling_systems_en_im0096325.pdf.*

\* cited by examiner

SYSTEMS AND METHODS FOR ASSESSING TRAILER UTILIZATION

BACKGROUND

In the commercial freight industry, Time of Flight (ToF) sensors are frequently used to analyze the interior of freight containers (e.g., a trailer) using three-dimensional (3D) and two-dimensional (2D) image data. As part of this analysis, the image data captured by ToF sensors is typically used to calculate load metrics associated with the tailer containers that indicate, for example, the container utilization at a given time during the loading/unloading process. Errors in these loading metrics can be problematic for shippers and customers as the containers may be inefficiently loaded and/or underutilized, and as a result, fuel may be wasted, and shipments may be delayed. Accordingly, a point of emphasis in the commercial freight industry is accurately and reliably performing trailer interior analytics to calculate load metrics, such as trailer utilization. These calculations are a substantial challenge for traditional systems as traditional systems cannot determine trailer utilization when the freight loaded onto a trailer is arranged chaotically and/or is non-conforming (e.g., non-conventionally packaged, non-uniform in shape and/or size, and/or require special handling (e.g., due to fragility)) such that it prohibits the placement of other freight thereon, underneath, and/or adjacent thereto. Thus, there is a need for systems and methods that accurately and reliably assess trailer utilization.

SUMMARY

In an embodiment, the present invention is a method for assessing trailer utilization. The method generates a map of an interior of a trailer where the map includes first voxels associated with the interior of the trailer. The method captures an image of the interior of the trailer where the image includes a plurality of 3D image data points. The method iterates over each 3D image data point to generate a set of 3D points indicative of respective 3D image data points that correspond to respective first voxels and generates a 3D map of an object based on the set of 3D points. The method determines whether the object is non-conforming. Responsive to determining that the object is non-conforming, the method determines second voxels associated with unusable space proximate to the non-conforming object from among the first voxels and third voxels associated with the non-conforming object from among the first voxels. Responsive to determining that the object is not non-conforming, the method determines fourth voxels associated with the not non-conforming object from among the first voxels. The method determines an occupied portion of the trailer based on the first voxels, the third voxels, and the fourth voxels and fills at least one region associated with the non-conforming object based on dimension data of the non-conforming object. The method determines trailer utilization based on the occupied portion of the trailer, the first voxels, and the second voxels.

In an embodiment, the present invention is a system for assessing trailer utilization. The system comprises a housing, an imaging assembly at least partially within the housing and configured to capture an image featuring a trailer; one or more processors; and a non-transitory computer-readable memory coupled to the imaging assembly and the one or more processors. The memory stories instructions thereon that, when executed by the one or more processors, cause the one or more processors to: generate a map of an interior of a trailer where the map includes first voxels associated with the interior of the trailer; capture an image of the interior of the trailer where the image includes a plurality of 3D image data points; iterate over each 3D image data point to generate a set of 3D points indicative of respective 3D image data points that correspond to respective first voxels; generate a 3D map of an object based on the set of 3D points; determine whether the object is non-conforming; responsive to determining that the object is non-conforming, determine second voxels associated with unusable space proximate to the non-conforming object from among the first voxels and third voxels associated with the non-conforming object from among the first voxels; responsive to determining that the object is not non-conforming, determine fourth voxels associated with the not non-conforming object from among the first voxels; determine an occupied portion of the trailer based on the first voxels, the third voxels, and the fourth voxels; fill at least one region associated with the non-conforming object based on dimension data of the non-conforming object; and determine trailer utilization based on the occupied portion of the trailer, the first voxels, and the second voxels.

In an embodiment, the present invention is a tangible machine-readable medium comprising instructions for assessing trailer utilization that, when executed, cause a machine to at least: generate a map of an interior of a trailer where the map includes first voxels associated with the interior of the trailer; capture an image of the interior of the trailer where the image includes a plurality of 3D image data points; iterate over each 3D image data point to generate a set of 3D points indicative of respective 3D image data points that correspond to respective first voxels; generate a 3D map of an object based on the set of 3D points; determine whether the object is non-conforming; responsive to determining that the object is non-conforming, determine second voxels associated with unusable space proximate to the non-conforming object from among the first voxels and third voxels associated with the non-conforming object from among the first voxels; responsive to determining that the object is not non-conforming, determine fourth voxels associated with the not non-conforming object from among the first voxels; determine an occupied portion of the trailer based on the first voxels, the third voxels, and the fourth voxels; fill at least one region associated with the non-conforming object based on dimension data of the non-conforming object; and determine trailer utilization based on the occupied portion of the trailer, the first voxels, and the second voxels.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Generally, freight carriers seek to accurately and efficiently analyze the load status of each container (e.g., trailer) for which they are responsible. These carriers may incorporate imaging systems to provide this analysis (e.g., load monitoring units (LMUs)). However, these traditional imaging systems suffer from a number of drawbacks, such as being unable to effectively determine trailer utilization in a wide variety of circumstances such as the loading of non-conforming freight. Non-conforming freight can be an object or item that is non-conventionally packaged, non-uniform in shape and/or size, and/or requires special handling (e.g., due to fragility) such that it prohibits the placement of other freight thereon, underneath, and/or adjacent thereto. Non-conforming freight can be problematic for shippers and customers as it can yield errors in trailer utilization indicative of inefficient trailer loading and/or trailer underutilization.

For example, a fragile freight object or item (e.g., a sculpture, a chandelier, etc.) may not allow for the placement of an additional object or item on top thereof. As another example, a piano can be packaged with one or more packing blankets to avoid contact with co-located items and to prohibit the placement of objects or items thereon. Additionally, the weight of a piano and its structure can prevent the piano from being placed on top of another object or item. Further, due to its relatively short height, this may yield a significant unusable void (e.g., open space) above the piano after being loaded into a trailer. Such unusable open space can cause a significant drop in trailer utilization indicative of loading inefficiencies and/or underutilization. However, due to the aforementioned constraints associated with non-conforming freight (e.g., non-conventional packaging, non-uniform in shape and/or size, fragility, etc.), this open space cannot be used.

As such, the methods and systems of the present disclosure provide solutions to the trailer utilization determination problems associated with traditional trailer utilization systems. Namely, a method and system of the present disclosure may provide for unusable open space to be determined as filled (e.g., utilized) space when determining trailer utilization. Alternatively, the unusable open space may be subtracted from an overall trailer volume when determining trailer utilization. In this manner, the methods and systems of the present disclosure improve over conventional techniques by determining trailer utilization for freight loads including mixed loads having non-conforming freight that prohibit the placement of other freight thereon, underneath, and/or adjacent thereto during outbound and inbound workflows.

Figure 1:
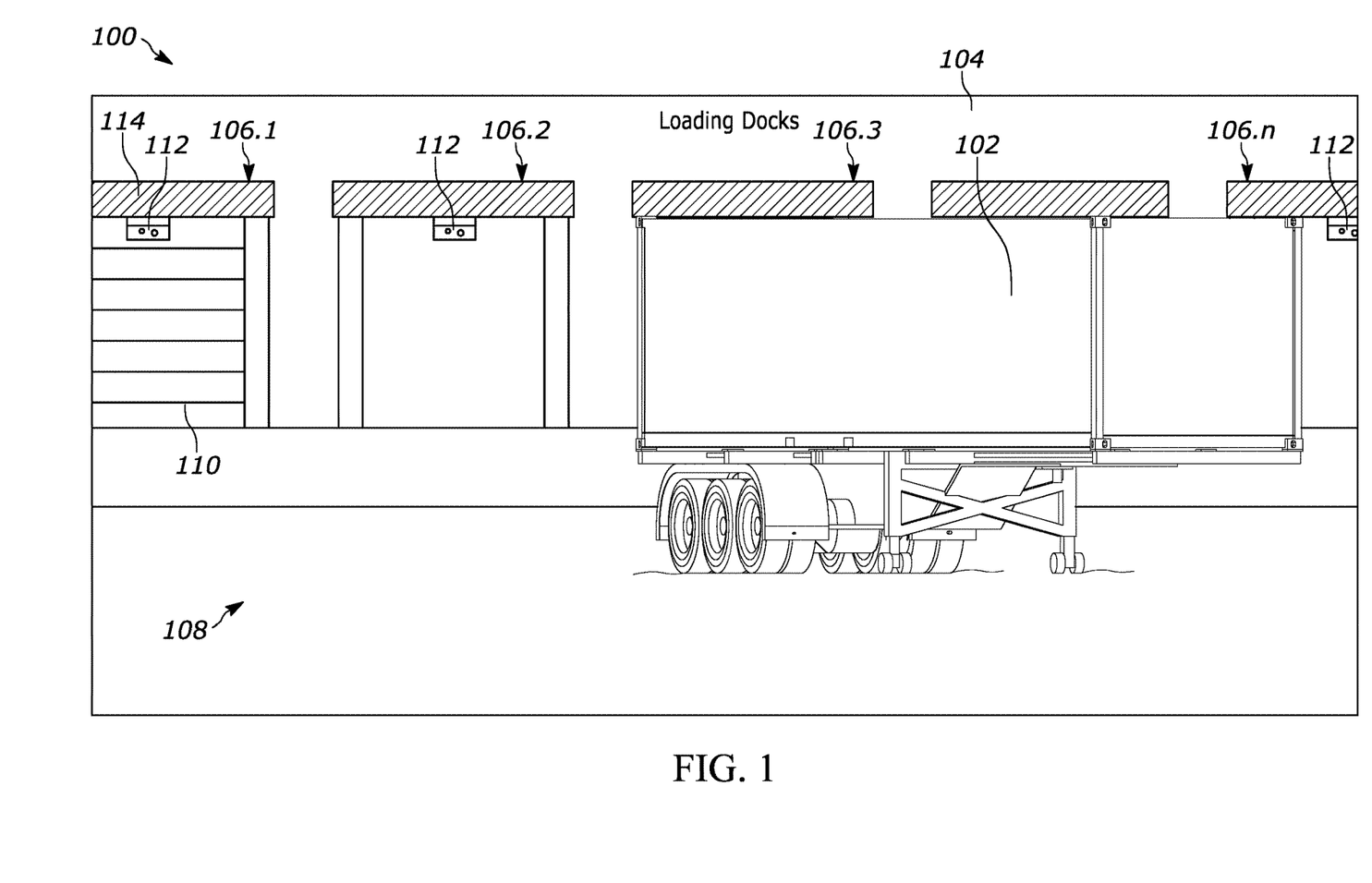
FIG. 1 illustrates a load facility, in accordance with embodiments described herein.

FIG. 1 illustrates an example environment where embodiments of the present invention may be implemented. In the present example, the environment is provided in a form of a loading dock 100 (also referenced herein as a "load facility") where containers (also referenced herein as "trailers") 102 are loaded or unloaded with various goods and/or where various goods are unloaded from the containers 102. The load dock 100 is comprised of a facility 104 having a plurality of load bays 106.1-106.$n$ facing a load facility lot 108 where vehicles, such as semi-trucks (not shown), deliver and pick up trailers 102. To be loaded or unloaded, each trailer 102 is backed in toward the facility 104 such that it is generally perpendicular with the wall having the plurality of loading bays 106.1-106.$n$, and in line with one of the loading bays (in this case 106.3). As illustrated, each respective load bay of the plurality of load bays 106.1-106.$n$ includes a bay door 110 that can be lowered to close the respective load bay or raised to open the respective load bay allowing the interior of the facility 104 to be accessible there through. Additionally, each respective loading bay is provided with a respective LMU 112. The respective LMU 112 is mounted near the trailer 102 loading area, preferably in the upper section of the respective loading bay outside the door 110 facing the load facility lot 108 or an interior/rear of a trailer 102 if one is docked at the respective load bay. To protect the respective LMU 112 from inclement weather, it could be mounted under a bay awning 114. Once docked, freight can be loaded onto/unloaded from the trailer 102 with the respective LMU 112 maintaining a view of the rear/inside of the trailer 102.

Figure 2:
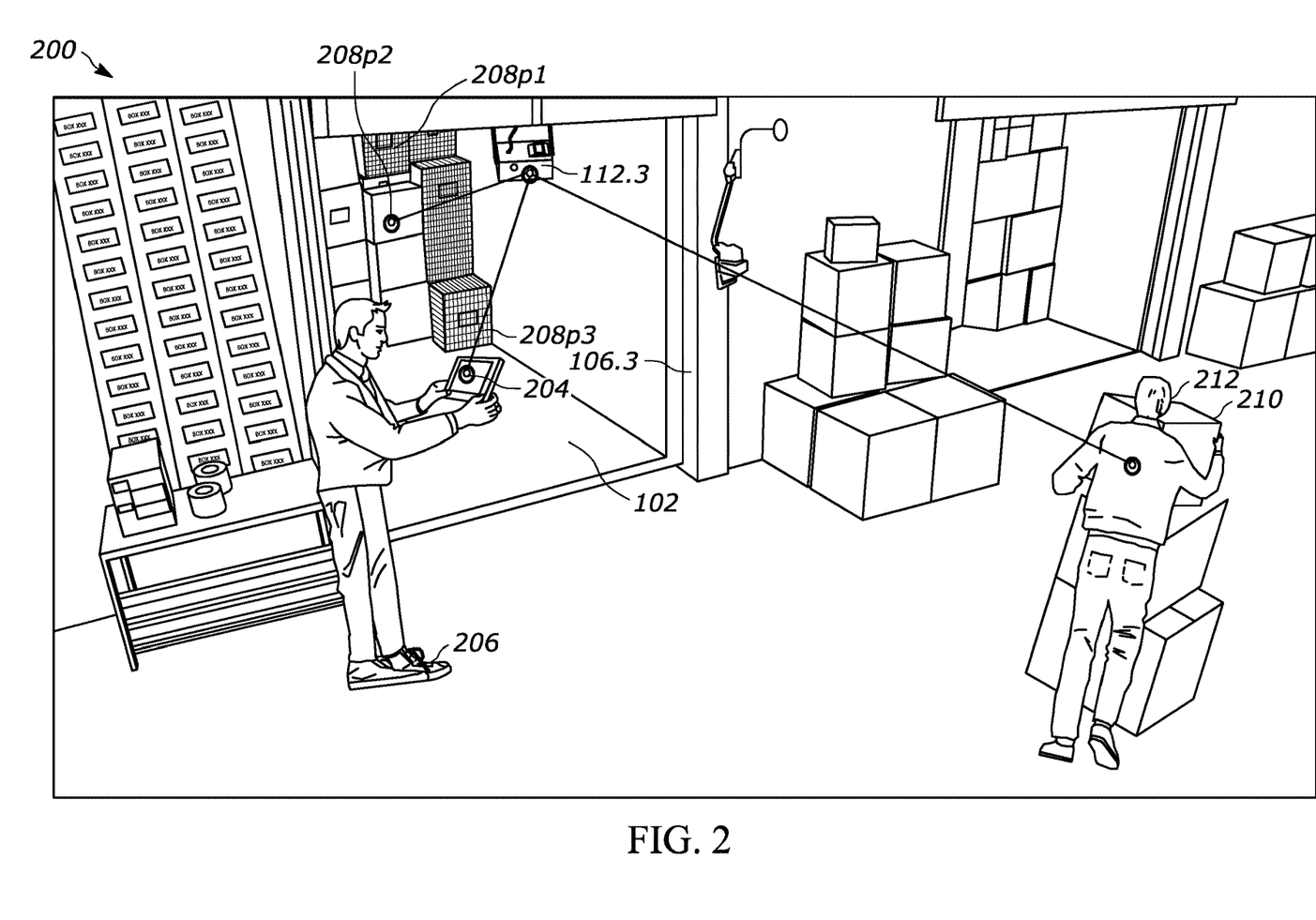
FIG. 2 illustrates an interior of the load facility of FIG. 1.

FIG. 2 is a perspective view 200 of the load facility 100 of FIG. 1 depicting trailer 102 docked at a load bay 106.3, in accordance with example embodiments herein. For example, FIG. 2 depicts trailer 102, which in the embodiment of FIG. 2 is an interior view of the trailer 102 of FIG. 1. FIG. 2 also depicts load bay 106.3, which in the embodiment of FIG. 2 is an interior view of the load bay 106.3 of FIG. 1. As depicted in FIG. 1, trailer 102 is docked with load bay 106.3 exposing the interior of trailer 102 to the interior of load facility 100. Trailer 102 includes packages, boxes, and/or other transportable objects or goods, including packages 208$p$1-208$p$3. The packages 208$p$1-208$p$3 may be in a state of being loaded or unloaded into trailer 102. For example, a worker 212 may be in a state of loading or unloading additional packages 210 into or out of trailer 102. In some embodiments, a manager 206 may oversee, assist, or otherwise additionally facilitate the loading or unloading packages, boxes, and/or other transportable objects or goods (e.g., packages 208p1-208p3 or 210) into or out of the trailer 102. For example, manager 206 may utilize a dashboard app executing on client device 204 as described herein.

FIG. 2 also depicts a LMU 112.3. LMU 112.3 may include one or more processors and one or more computer memories for storing image data, and/or for executing apps that perform analytics or other functions as described herein. In various embodiments, and as shown in FIG. 2, the LMU 112.3 may be mounted within loading facility 100 and oriented in the direction of trailer 102 to capture 3D and/or 2D image data of the interior of trailer 102. For example, as shown in FIG. 2, LMU 112.3 may be oriented such that the 3D and 2D cameras of LMU 112.3 look down the length of the trailer 102 so that LMU 112.3 may scan or sense the walls, floor, ceiling, packages (e.g., 208p1-208p3 or 210), or other objects or surfaces with trailer 102 to determine the 3D and 2D image data. The image data may be processed by the one or more processors and/or memories of the LMU 112.3 (or, in some embodiments, one or more remote processors and/or memories of a server) to implement analysis, functions, such as graphical or imaging analytics, as described by the one or more various flowcharts, block diagrams, methods, functions, or various embodiments herein.

In some embodiments, for example, the LMU 112.3 may process the 3D and 2D image data, as scanned or sensed from the 3D-depth camera and photo-realistic camera, for use by other devices (e.g., client device 204). For example, the one or more processors and/or one or more memories of the LMU 112.3 may process the image data scanned or sensed from trailer 102. The processing of the image data may generate post-scanning data that may include metadata, simplified data, normalized data, result data, status data, or alert data as determined from the original scanned or sensed image data. In some embodiments, the image data and/or the post-scanning data may be sent to a client application, such as a dashboard application (app) described herein, for viewing, manipulation, or otherwise interaction. In other embodiments, the image data and/or the post-scanning data may be sent to a server for storage or for further manipulation.

As shown in FIG. 2, the image data and/or the post-scanning data may be received on client device 204. Client device 204 may implement a dashboard app to receive the image data and/or the post-scanning data and display such data, e.g., in graphical or other format, to manager 206 to facilitate the unloading or loading of packages (e.g., 208p1-208p3 or 210), as described herein. In some embodiments, the dashboard app may receive the image data and/or the post-scanning data and display such data in real-time. Client device 204 may be a mobile device, such as a tablet, smartphone, laptop, or other such mobile computing device. Client device 204 may also include wired or wireless transceivers for receiving image data and/or post-scanning data as described herein. Such wired or wireless transceivers may implement one or more communication protocol standards including, for example, TCP/IP, Wi-Fi (802.11b), Bluetooth, or any other similar communication protocols or standards.

In some embodiments, the image data and/or the post-scanning data may be sent to a server. In such embodiments, the server may generate post-scanning data, that may include metadata, simplified data, normalized data, result data, status data, or alert data as determined from the original scanned or sensed image data provided by the LMU 112.3. As described herein, the server may store such data, and may also send the image data and/or the post-scanning data to a dashboard app, or other app, implemented on a client device, such as the dashboard app implemented on client device 204 of FIG. 2.

Figure 3:
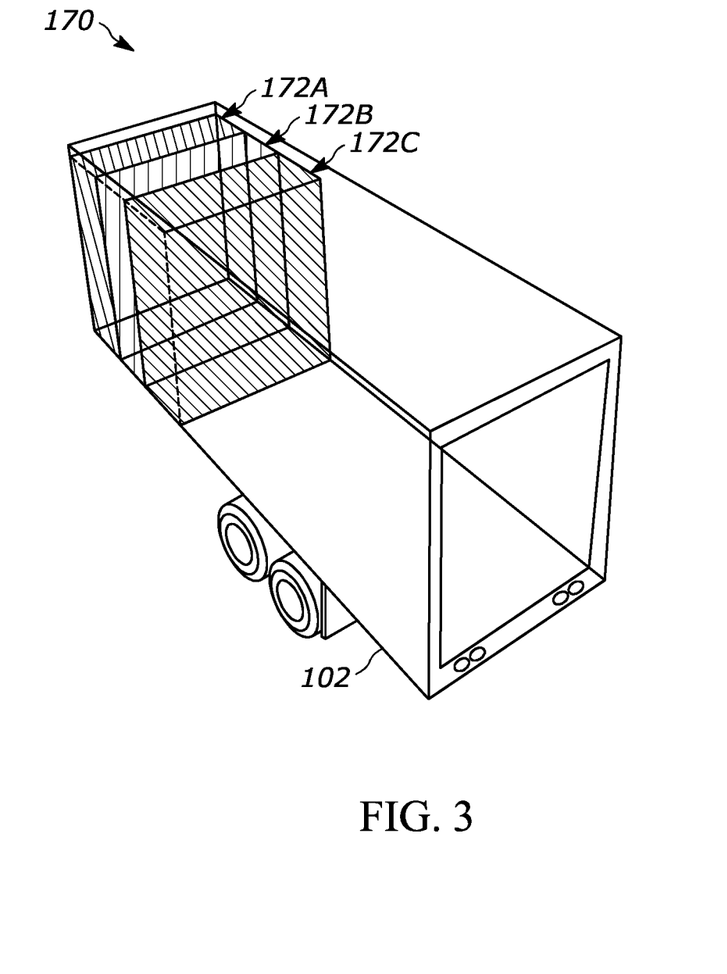
FIG. 3 illustrates an interior loading/unloading arrangement of the trailer of FIG. 1, in accordance with embodiments described herein.

FIG. 3 illustrates an interior loading/unloading arrangement 170 of the trailer 102 of FIG. 1, in accordance with embodiments described herein. As previously mentioned, loading freight objects or items (e.g. packages, boxes, etc.) onto trailers constrained in time can be chaotic and unorganized, especially when the individual freight objects or items are non-conforming (e.g., non-conventionally packaged, non-uniform in shape and/or size, and/or require special handling (e.g., due to fragility)). However, when a majority of freight objects or items are conforming (e.g., cuboidal in shape and similar in size), packing can generally be loaded in a fashion similar to erecting a brick wall, as depicted in FIG. 3.

In particular, as illustrated in FIG. 3, the interior loading/unloading arrangement 170 includes three freight walls 172A-C (also referenced herein as "package walls"). Workers (e.g., worker 212) may systematically place each individual box along the trailer floor until a complete row of boxes at a particular height is formed. The workers may then proceed to stack another complete row of boxes on top of the previous row, thereby creating a freight wall, until the freight wall reaches the trailer ceiling, at which point the workers may proceed to create a new freight wall by placing boxes on the trailer floor in front of the prior freight wall. The workers may iteratively continue this freight wall loading process until the workers either exhaust the number of boxes/packages waiting to be loaded onto the trailer, and/or the freight walls reach the front edge of the trailer (e.g., near the trailer door).

Figure 4:
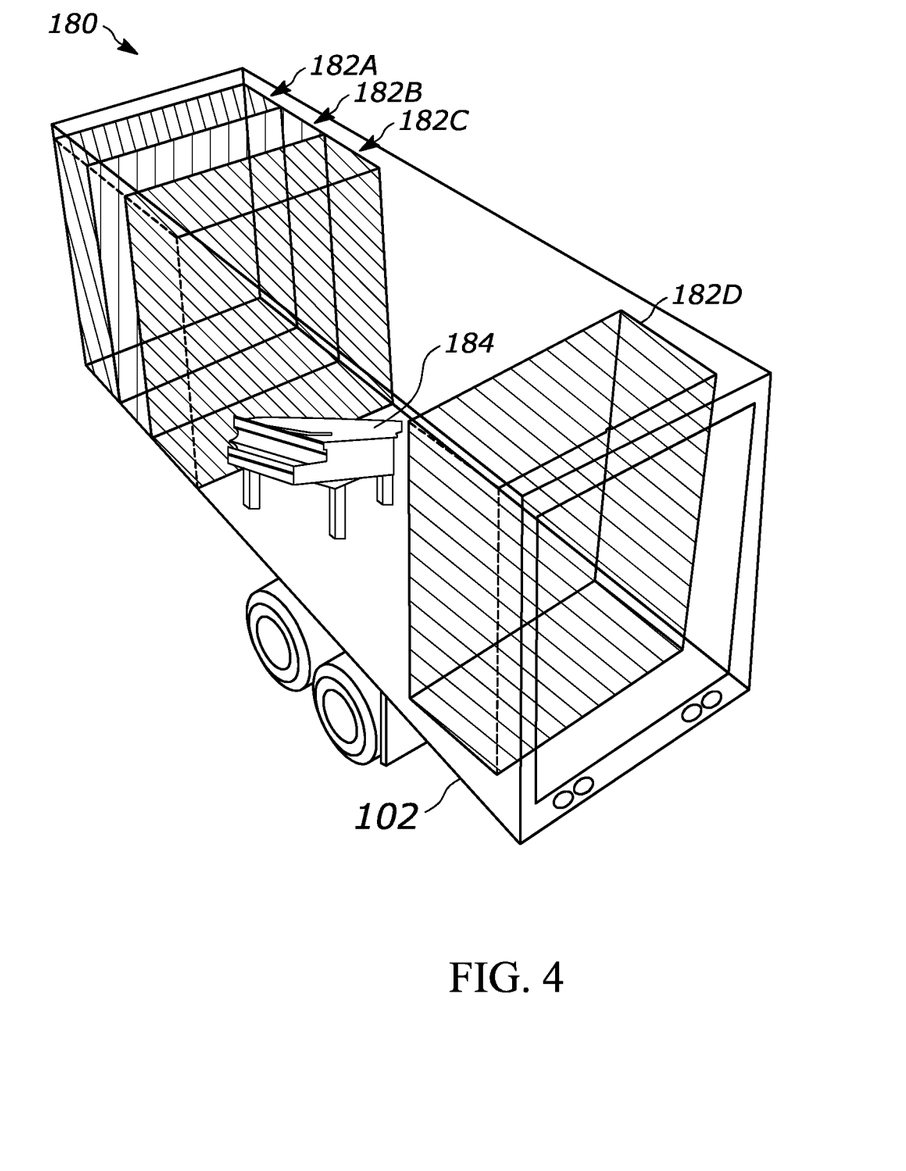
FIG. 4 illustrates another interior loading/unloading arrangement of the trailer of FIG. 1, in accordance with embodiments described herein.

FIG. 4 illustrates another interior loading/unloading arrangement 180 of the trailer 102 of FIG. 1, in accordance with embodiments described herein, that suffers from non-utilized trailer space. More specifically, as shown in FIG. 4, the freight walls 182A-C and 182D are divided by a non-conforming freight object 184 (e.g., a piano). To accommodate the non-conforming freight object 184, the workers (e.g., worker 212) may place the non-conforming freight object 184 in front of the freight walls 182A-C and may proceed to create a new freight wall 182D by placing boxes on the trailer floor in front of the non-conforming freight object 184. Alternatively, to accommodate the non-conforming freight object 184, the workers may determine one or more bounds of the non-conforming freight object 184 and may proceed to complete a freight wall (not shown) by placing boxes adjacent to the one or more bounds of the non-conforming freight object 184. The workers may iteratively continue this freight wall loading process until the workers either exhaust the number of boxes/packages waiting to be loaded onto the trailer 102, and/or the freight walls reach the front edge of the trailer 102 (e.g., near the trailer door as shown in FIG. 4).

As shown in FIG. 4, the loading arrangement for a non-conforming freight object 184 can result in large portions of unused space within a trailer 102 because the non-conforming freight object 184 generally does not reach the trailer ceiling (e.g., it cannot be placed on top of other boxes/packages due to weight and structure constraints) and/or other boxes/packages are prohibited from being placed underneath and/or adjacent thereto due to non-conventional packaging and/or fragility constraints. As described herein, the systems and methods of the present disclosure overcome these limitations of conventional systems by actively tracking and updating the unused space within a trailer associated with one or more non-conforming freight objects regardless of whether or not the unused space remains unobscured from the LMU's FOV. Systems and methods can use the LMU, as illustrated in FIG. 5.

Figure 5:
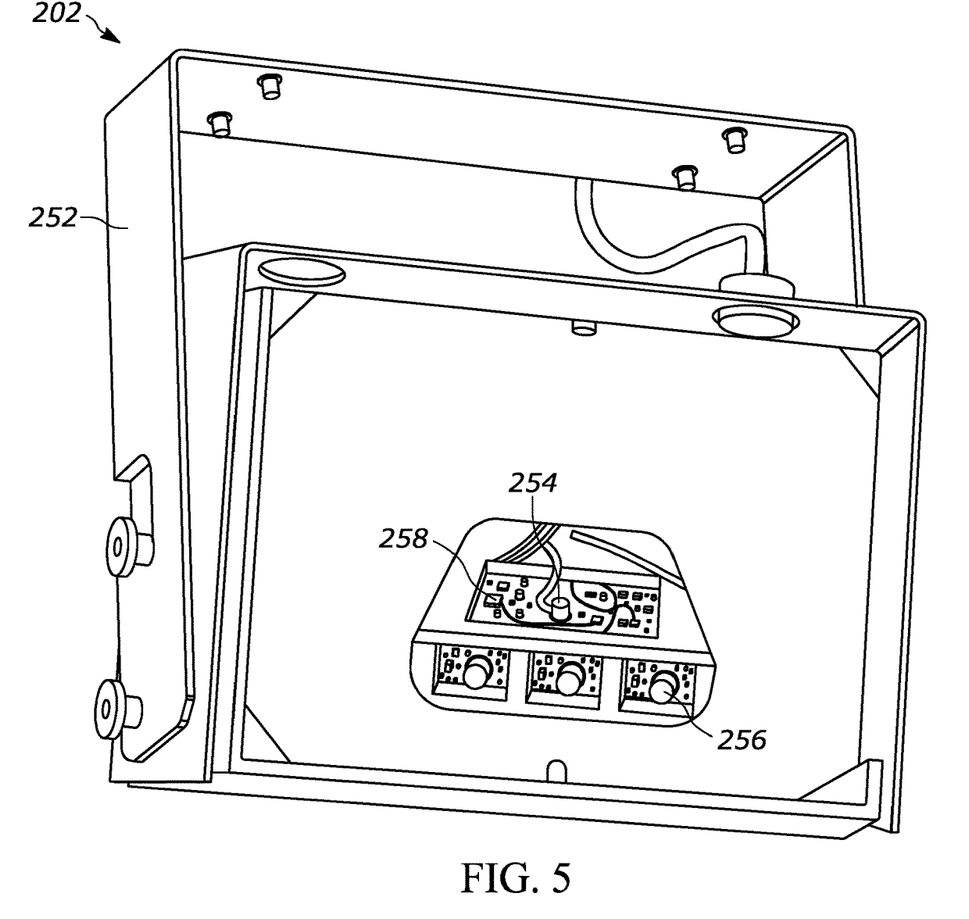
FIG. 5 illustrates a load monitoring unit (LMU), in accordance with embodiments described herein.

FIG. 5 illustrates a load monitoring unit (LMU), in accordance with embodiments described herein. As shown in FIG. 5, the LMU 202 is a mountable device that includes a mounting bracket 252 for orienting or otherwise positioning the LMU 202 within a load facility (e.g., load facility 100). The LMU 202 may further include one or more processors and one or more memories for processing image data as described herein. For example, the LMU 202 may include flash memory used for determining, storing, or otherwise processing the imaging data/datasets and/or post-scanning data. In addition, LMU 202 may further include a network interface to enable communication with other devices.

LMU 202 may include a 3D camera 254 (also referenced herein as a "Time-of-Flight (ToF) camera") for capturing, sensing, or scanning 3D image data/datasets. For example, in some embodiments, the 3D camera 254 may include an Infra-Red (IR) projector and a related IR camera. In such embodiments, the IR projector projects a pattern of IR light or beams onto an object or surface, which, in various embodiments herein, may include surfaces or areas of a predefined search space (e.g., load bay 106.3) or objects within the predefined search area, such as boxes or packages (e.g., packages 208p1-208p3) and non-conforming freight items 184 of trailer 102. The IR light or beams may be distributed on the object or surface in a pattern of dots or points by the IR projector, which may be sensed or scanned by the IR camera. A depth-detection app, such as a depth-detection app executing on the one or more processors or memories of LMU 202, can determine, based on the pattern of dots or points, various depth values, for example, depth values of the predefined search area. For example, a near-depth object (e.g., nearby boxes, packages, non-conforming freight items, etc.) may be determined where the dots or points are dense, and distant-depth objects (e.g., far boxes, packages, non-conforming freight items, etc.) may be determined where the points are more spread out. The various depth values may be used by the depth-detection app and/or LMU 202 to generate a depth map. The depth map may represent a 3D image of, or contain 3D image data of, the objects or surfaces that were sensed or scanned by the 3D camera 254, for example, the trailer 102 and any objects, areas, or surfaces therein. The 3D camera 254 may also be configured to capture other sets of image data in addition to the 3D image data, such as grayscale image data, ambient image data, amplitude image data, and/or any other suitable image data or combination thereof.

LMU 202 may further include a photo-realistic camera 256 for capturing, sensing, or scanning 2D image data. The photo-realistic camera 256 may be a RGB (red, green, blue) based camera for capturing 2D images having RGB-based pixel data. In some embodiments, the photo-realistic camera 256 may capture 2D images, and related 2D image data, at the same or similar point in time as the 3D camera 254 such that the LMU 202 can have both sets of 3D image data and 2D image data available for a particular surface, object, area, or scene at the same or similar instance in time. In embodiments, the 3D camera 254 and the photo-realistic camera 256 may be a single imaging apparatus configured to capture 3D depth image data simultaneously with 2D image data. A such, the captured 2D images and the corresponding 2D image data may be depth-aligned with the 3D images and 3D image data.

LMU 202 may also include a processing board 258 configured to, for example, perform trailer utilization estimation and other advanced analytical algorithms based on images captured by the cameras 254, 256. Generally, the processing board 258 may include one or more processors and one or more computer memories for storing image data, and/or for executing apps that perform analytics or other functions as described herein. The processing board 258 may also include transceivers and/or other components configured to communicate with external devices/servers. The processing board 258 may thus transmit and/or receive data or other signals to/from external devices/servers before, during, and/or after performing the analytical algorithms described herein.

Figure 6:
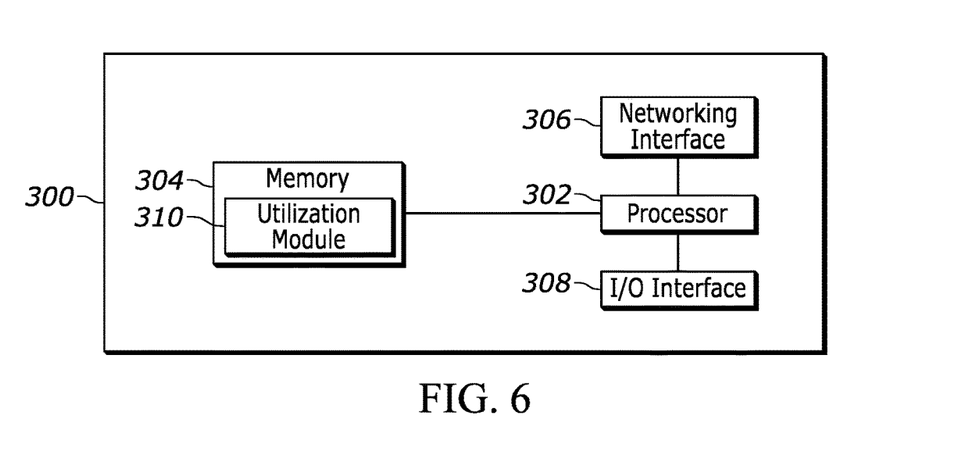
FIG. 6 is a block diagram of an example logic circuit for implementing example methods and/or operations described herein.

FIG. 6 is a block diagram representative of an example logic circuit capable of implementing, for example, one or more components of the example processing board 258 of FIG. 5 or, more generally, the example LMU 202 of FIG. 5. The example logic circuit of FIG. 6 is a processing platform 300 capable of executing instructions to, for example, implement operations of the example methods described herein, as may be represented by the flowcharts of the drawings that accompany this description. Other example logic circuits capable of, for example, implementing operations of the example methods described herein include field programmable gate arrays (FPGAs) and application specific integrated circuits (ASICs).

The example processing platform 300 of FIG. 6 includes a processor 302 such as, for example, one or more microprocessors, controllers, and/or any suitable type of processor. The example processing platform 300 of FIG. 6 includes memory (e.g., volatile memory, non-volatile memory) 304 accessible by the processor 302 (e.g., via a memory controller). The example processor 302 interacts with the memory 304 to obtain, for example, machine-readable instructions stored in the memory 304 corresponding to, for example, the operations represented by the flowcharts of this disclosure. The memory 304 also includes a utilization module 310 that is accessible by the example processor 302. The utilization module 310 may comprise rule-based instructions, an artificial intelligence (AI) and/or machine learning-based model, and/or any other suitable algorithm architecture or combination thereof configured to, for example, perform trailer utilization analysis using content captured by the TMU 202. To illustrate, the example processor 302 may access the memory 304 to execute the utilization module 310 when the TMU 200 captures an image that features a trailer.

Additionally, or alternatively, machine-readable instructions corresponding to the example operations described herein may be stored on one or more removable media (e.g., a compact disc, a digital versatile disc, removable flash memory, etc.) that may be coupled to the processing platform 300 to provide access to the machine-readable instructions stored thereon.

The example processing platform 300 of FIG. 6 also includes a networking interface 306 to enable communication with other machines via, for example, one or more networks. The example networking interface 306 includes any suitable type of communication interface(s) (e.g., wired and/or wireless interfaces) configured to operate in accordance with any suitable protocol(s) (e.g., Ethernet for wired communications and/or IEEE 802.11 for wireless communications).

The example, processing platform 300 of FIG. 6 also includes input/output (I/O) interfaces 308 to enable receipt of user input and communication of output data to the user.

Such user input and communication may include, for example, any number of keyboards, mice, USB drives, optical drives, screens, touchscreens, etc.

Figure 7:
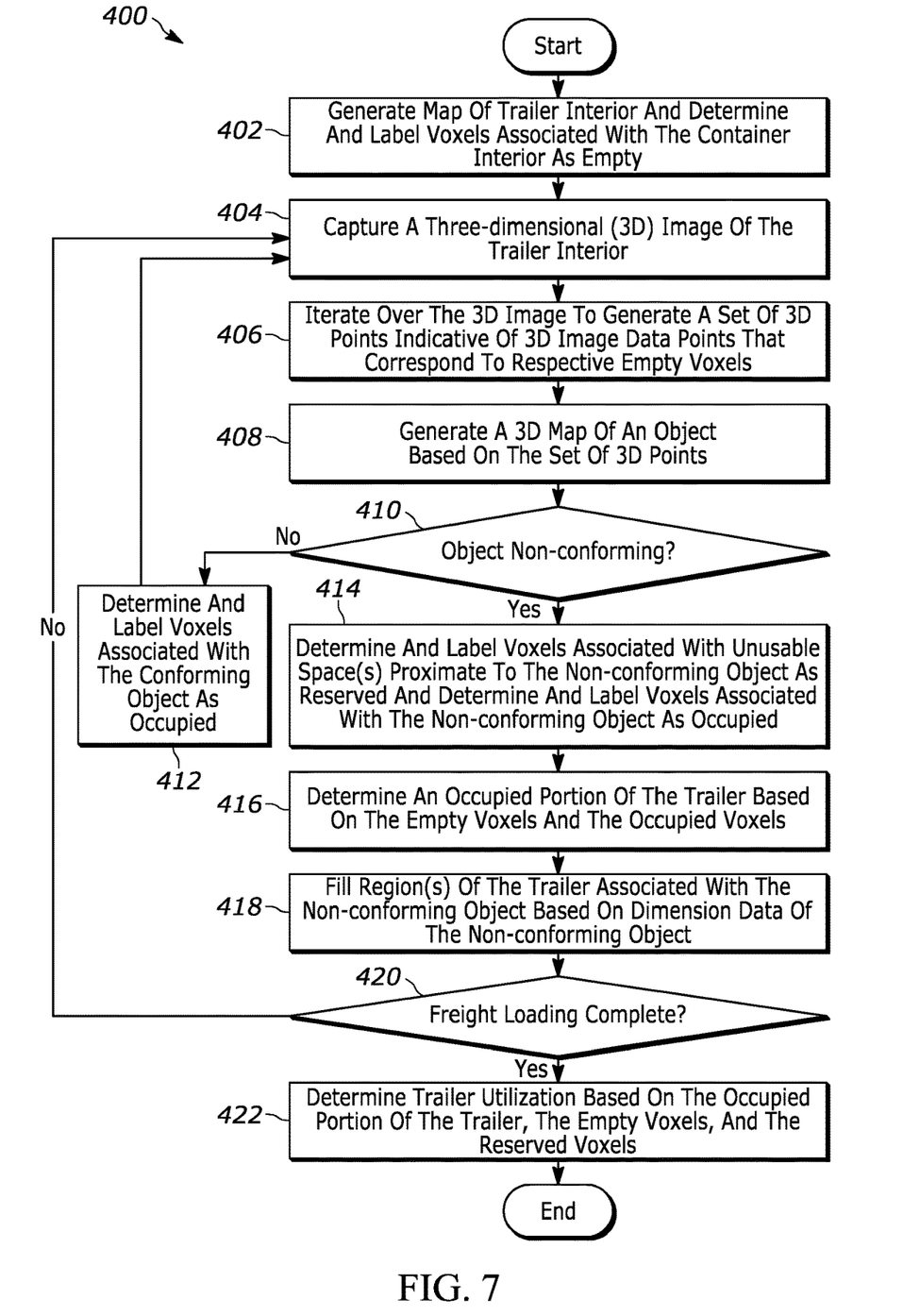
FIG. 7 is a flowchart representative of a method for assessing trailer utilization, in accordance with embodiments described herein.

FIG. 7 is a flowchart representative of a method 400 for assessing trailer utilization, in accordance with embodiments described herein. It should be appreciated that any of the actions described herein with respect to the method 400 may be performed by any suitable component, such as the processors 302 utilizing executable instructions stored in the memory 304 (e.g., utilization module 310), and/or any other components or combinations thereof. Moreover, it is important to note that the actions described herein with respect to the method 400 may be performed iteratively during the loading/unloading of a trailer to capture image data corresponding to the respective regions of the trailer before, during, and after the workflow is completed. In this manner, the method 400 may actively calculate trailer utilization during the load process and avoid losing critical image data as a result of continued blocking of regions from the FOV of the LMU.

Beginning in step 402, the method 400 generates a map of an interior of a trailer and determines and labels voxels associated with the trailer interior. The voxels associated with the trailer interior can be labeled as "empty" or can be set to an "empty" state as described in further detail herein in relation to FIG. 8.

Figure 8:
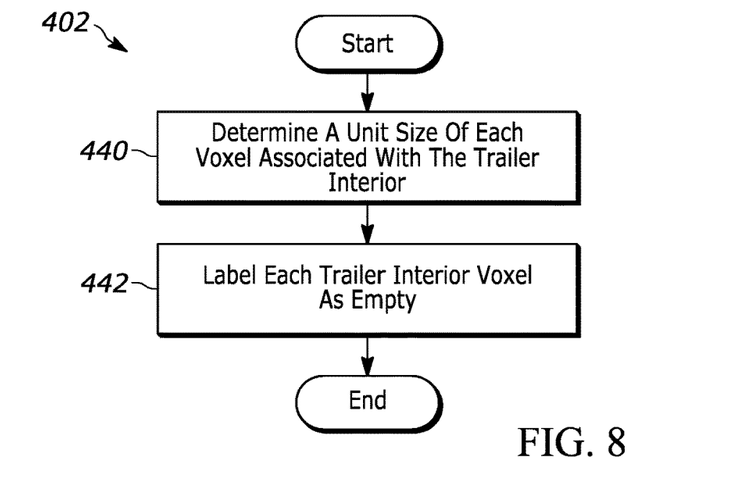
FIG. 8 is a flowchart illustrating step 402 of FIG. 7 in greater detail.

FIG. 8 is a flowchart illustrating step 402 of FIG. 7 in greater detail. As shown in FIG. 8, in step 440, the method determines a unit size of each voxel associated with the trailer interior. As an example, the unit size can correspond to a volume of each voxel. Then, in step 442, the method 400 labels each voxel associated with the trailer interior as "empty" or sets each voxel associated with the trailer interior to an "empty" state.

Referring back to FIG. 7, in step 404, the method 400 captures a three-dimensional (3D) image of the trailer interior. The captured image can include a plurality of 3D image data points. Then, in step 406, the method 400 iterates over the 3D image to generate a set of 3D points indicative of 3D image data points that correspond to respective empty voxels as described in further detail herein in relation to FIG. 9.

Figure 9:
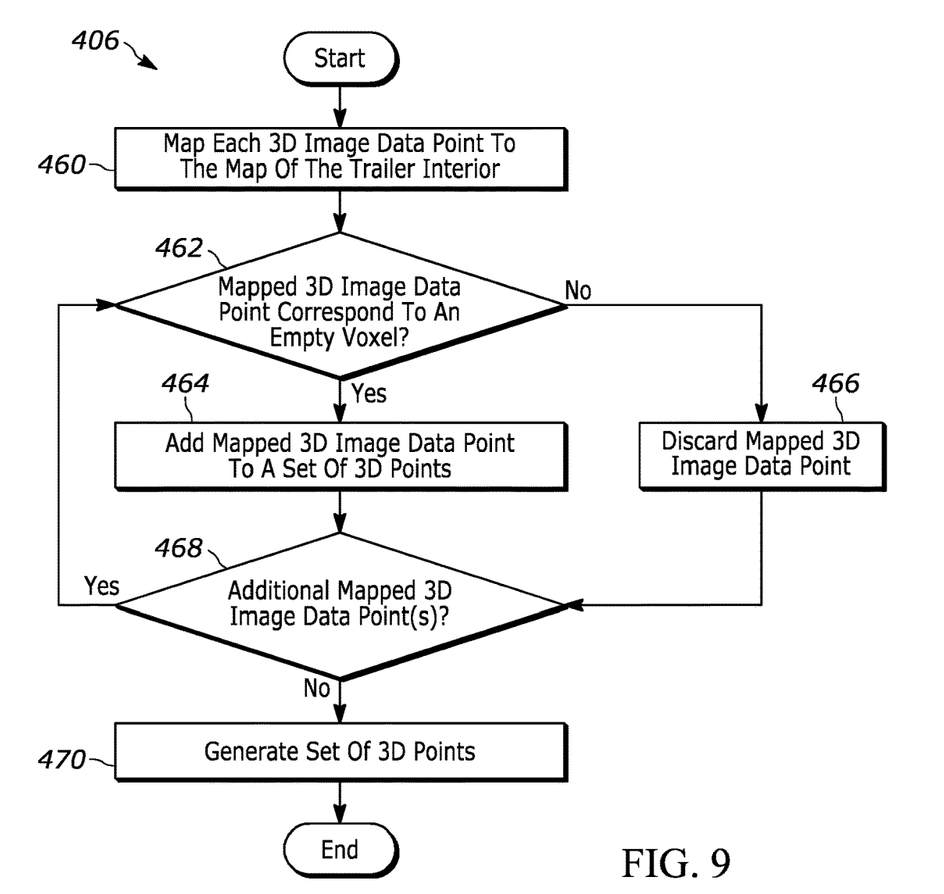
FIG. 9 is a flowchart illustrating step 406 of FIG. 7 in greater detail.

FIG. 9 is a flowchart illustrating step 406 of FIG. 7 in greater detail. As shown in FIG. 9, in step 460, the method maps each 3D image data point to the map of the trailer interior. Then, in step 462, the method determines whether a mapped 3D image data point corresponds to an empty voxel. If the method determines that the mapped 3D image data point corresponds to an empty voxel, then the method proceeds to step 464. In step 464, the method adds the mapped 3D image data point to a set of 3D points. The method then proceeds to step 468. Alternatively, if the method determines that the mapped 3D image data point does not correspond to an empty voxel, then the method proceeds to step 466. In step 466, the method discards the mapped 3D image data point. The method then proceeds to step 468.

In step 468, the method determines whether there is an additional mapped 3D image data point. If the method determines that there is an additional mapped 3D image data point, then the method returns to step 462. Alternatively, if the method determines that there is not an additional mapped 3D image data point, then the method proceeds to step 470. In step 470, the method generates a set of 3D points. As mentioned above, the set of 3D points is indicative of 3D image data points that correspond to respective empty voxels.

Referring back to FIG. 7, in step 408, the method 400 generates a 3D map of an object based on the generated set of 3D points. Then, in step 410, the method determines whether the object is non-conforming. As mentioned above, non-conforming freight such as an object or item can be non-conventionally packaged, non-uniform in shape and/or size, and/or require special handling (e.g., due to fragility) such that it prohibits the placement of other freight thereon, underneath, and/or adjacent thereto. Alternatively, conforming freight such as an object or item may not have constraints (e.g., non-conventional packaging, non-uniform shape and/or size, and/or a special handling requirement (e.g., due to fragility)) prohibiting the placement of other freight thereon, underneath, and/or adjacent thereto. The method 400 can determine whether the object is non-conforming based on one of a template matching technique (e.g., matching a first template indicative of the set of 3D points and a second template indicative of at least one non-conforming object), processing scanning data and attributes thereof (e.g., dimension data) of the object, and utilizing a trained model to classify the object as non-conforming.

If the method 400 determines that the object is conforming (e.g., not non-conforming), then the method 400 proceeds to step 412. In step 412, the method 400 determines and labels voxels associated with the conforming object as occupied and then the method returns to step 404. Alternatively, if the method 400 determines that the object is non-conforming, then the method 400 proceeds to step 414. In step 414, the method 400 determines and labels voxels associated with unusable space(s) proximate to the non-conforming object as reserved and determines and labels voxels associated with the non-conforming object as occupied. The voxels associated with the unusable space(s) proximate to the non-conforming object can be labeled as "reserved" or can be set to a "reserved" state and the voxels associated with the non-conforming object can be labeled as "occupied" or can be set to an "occupied" state as described in further detail herein in relation to FIG. 10.

Figure 10:
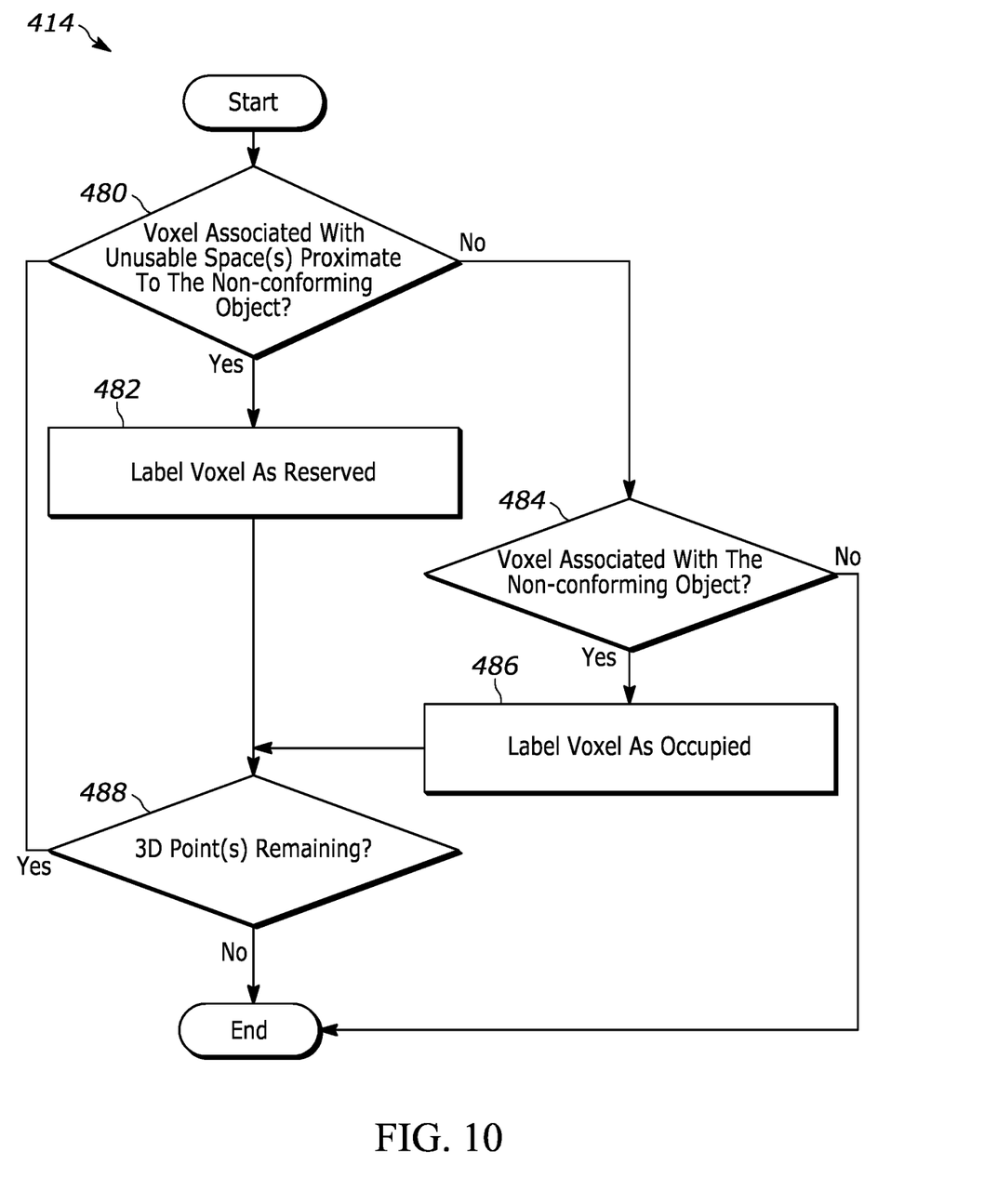
FIG. 10 is a flowchart illustrating step 414 of FIG. 7 in greater detail.

FIG. 10 is a flowchart illustrating step 414 of FIG. 7 in greater detail. As shown in FIG. 10, in step 480, the method determines whether a voxel associated with unusable space is proximate to the non-conforming object. If the method determines that the voxel associated with the unusable space is proximate to the non-conforming object, then the method proceeds to step 482, and, in step 482 the method labels the voxel as "reserved" or sets the voxel to a "reserved" state. The method then proceeds to step 488. The method can determine unusable space proximate to the non-conforming object by any suitable technique such as by utilizing one or more predetermined parameters associated with a non-conforming object template or by denoting the vertical and horizontal space around the non-conforming object as unusable. Alternatively, if the method determines that the voxel associated with the unusable space is not proximate to the non-conforming object, then the method proceeds to step 484. In step 484, the method determines whether the voxel is associated with the non-conforming object. If the system determines that the voxel is associated with the non-conforming object, then the method proceeds to step 486 and, in step 486, the method labels the voxel as "occupied" or sets the voxel to an "occupied" state. The method then proceeds to step 488. Alternatively, if the method determines that the voxel is not associated with the non-conforming object, then the method ends. In step 488, the method determines whether there is an additional 3D point. If the method determines that there is an additional 3D point, then the method returns to step 480. Alternatively, if the method determines that there is not an additional 3D point, then the method ends.

Referring back to FIG. 7, in step 416 the method 400 determines an occupied portion of the trailer based on the empty voxels and the occupied voxels. For example, the method 400 can determine an occupied portion of the trailer by determining a volume of each empty voxel, determining a total of the empty voxels and the occupied voxels, and dividing the occupied voxels by the total of the empty voxels and the occupied voxels. In another example, the method 400 can determine an occupied portion of the trailer by determining a total volume of the trailer and subtracting the empty volume.

Then, in step 418, the method 400 fills one or more regions of the trailer associated with the non-conforming object based on dimension data of the non-conforming object. The method can obtain the dimension data of the non-conforming object via scanning data (e.g., barcode data, object dimensioning data, packaging data, etc.) of the non-conforming object prior to loading the non-conforming object in the trailer. The method can also utilize region-based algorithms to fill in the one or more regions of the trailer associated with the non-conforming object based on the dimension data of the non-conforming object.

In step 420, the method 400 determines whether freight loading of the trailer is complete. If the method 400 determines that the freight loading of the trailer is not complete, then the method 400 returns to step 404. Alternatively, if the method 400 determines that the freight loading of the trailer is complete, then the method 400 proceeds to step 422. In step 422, the method 400 determines trailer utilization based on the occupied portion of the trailer, the empty voxels and the reserved voxels. For example, the method 400 can determine trailer utilization by dividing a total of the occupied voxels and the reserved voxels by a total of the occupied voxels, the reserved voxels and the empty voxels. Alternatively, the method 400 can determine trailer utilization by dividing a total of the occupied voxels by a total of the occupied and empty voxels minus the reserved voxels.

In an embodiment, the method 400 can generate a 3D model visualization of the trailer indicative of the trailer utilization and can display, on a user interface, the 3D model visualization of the trailer for a user. The 3D model visualization of the trailer can include a graphical rendering indicating a region within the trailer corresponding to the non-conforming object.

Figure 11:
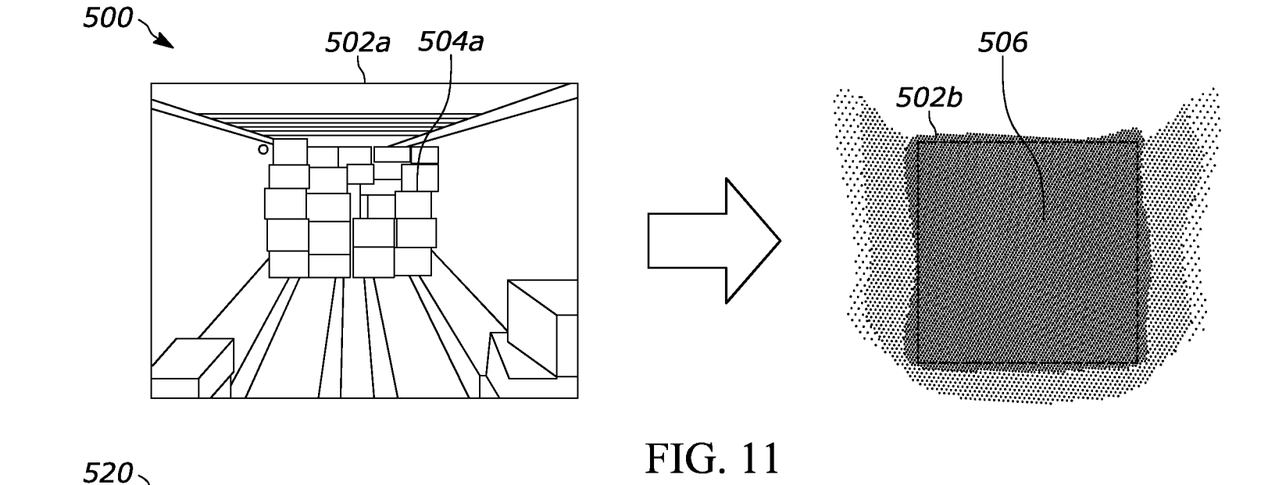
FIG. 11 is an example visualization of a loaded trailer including conforming freight objects that illustrates trailer utilization, in accordance with embodiments described herein.

FIG. 11 is an example visualization of a loaded trailer including conforming freight objects that illustrates trailer utilization, in accordance with embodiments described herein. As shown in FIG. 11, image 502a illustrates a loaded trailer including a plurality of conforming freight objects 504a (e.g., boxes). Image 502b illustrates a graphical representation of image 502a having a region 506 that denotes voxels indicative of empty space in front of the plurality of conforming freight objects 504a.

Figure 12:
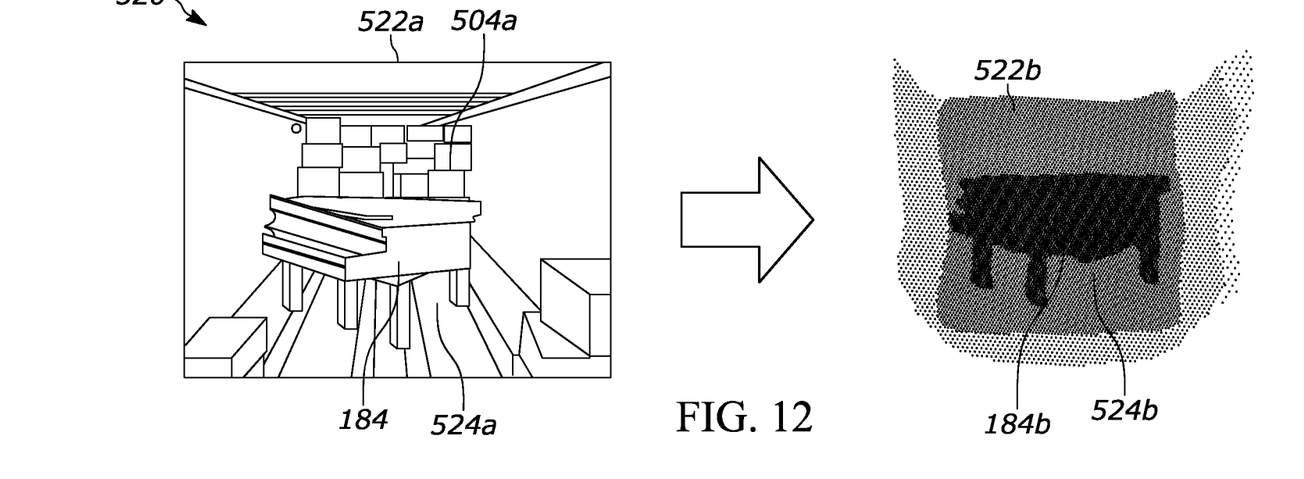
FIG. 12 is an example visualization of the loaded trailer of FIG. 11 including a non-conforming freight object that illustrates trailer utilization, in accordance with embodiments described herein.

FIG. 12 is an example visualization of the loaded trailer of FIG. 11 including a non-conforming freight object that illustrates trailer utilization, in accordance with embodiments described herein. As shown in FIG. 12, image 522a illustrates a loaded trailer including a non-conforming freight object 184 (e.g., a piano) loaded in front of the plurality of conforming freight objects 504a of FIG. 11. As also shown in FIG. 12, the non-conforming object 184 has unusable spaces 524a associated therewith (e.g., unusable spaces proximate to the non-conforming freight object 184). Image 522b illustrates a graphical representation of image 522a having a region 524b that denotes voxels indicative of the unusable space proximate to the non-conforming freight object 184 and voxels 184b associated with the non-conforming freight object 184.

Accordingly, the methods and systems of the present disclosure may provide for unusable open space to be determined as filled (e.g., utilized) space when determining trailer utilization. Alternatively, the unusable open space may be subtracted from an overall trailer volume when determining trailer utilization. In this manner, the methods and systems of the present disclosure improve over conventional techniques by determining trailer utilization for freight loads including mixed loads having non-conforming freight that prohibit the placement of other freight thereon, underneath, and/or adjacent thereto during outbound and inbound workflows.

The above description refers to a block diagram of the accompanying drawings. Alternative implementations of the example represented by the block diagram includes one or more additional or alternative elements, processes and/or devices. Additionally, or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, the term "container" shall refer to any container transportable by at least one of a vehicle, a train, a marine vessel, and airplane, and configured to store transportable goods such as boxed and/or unboxed items and/or other types of freight. Accordingly, an example of a container includes an enclosed container fixedly attached to a platform with wheels and a hitch for towing by a powered vehicle. An example of a container also includes an enclosed container removably attached to a platform with wheels and a hitch for towing by a powered vehicle. An example of a container also includes an enclosure that is fixedly attached to a frame of a powered vehicle, such as the case may be with a delivery truck, box truck, etc. As such, while the exemplary embodiment(s) described below may appear to reference one kind of a container, the scope of the invention shall extend to other kinds of container, as defined above. Furthermore, the term "trailer" is an example of application of a container, in particular, a container used with a vehicle, such as a powered vehicle, like a delivery truck, box truck, etc.

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A method for assessing trailer utilization, comprising:
   generating a map of an interior of a trailer, the map including first voxels associated with the interior of the trailer;
   capturing an image of the interior of the trailer, the image including a plurality of three-dimensional (3D) image data points;
   iterating over each 3D image data point to generate a set of 3D points indicative of respective 3D image data points that correspond to respective first voxels;
   generating a 3D map of an object based on the set of 3D points;

determining whether the object is non-conforming;
responsive to determining that the object is non-conforming, determining second voxels associated with unusable space proximate to the non-conforming object from among the first voxels and third voxels associated with the non-conforming object from among the first voxels;
responsive to determining that the object is not non-conforming, determining fourth voxels associated with the not non-conforming object from among the first voxels;
determining an occupied portion of the trailer based on the first voxels, the third voxels, and the fourth voxels;
filling at least one region associated with the non-conforming object based on dimension data of the non-conforming object;
determining trailer utilization based on the occupied portion of the trailer, the first voxels, and the second voxels; and
displaying, on a user interface, the trailer utilization for a user.

2. The method of claim 1, wherein iterating over each 3D image data point to generate a set of 3D points indicative of respective 3D image data points that correspond to respective first voxels comprises:
mapping each 3D image data point to the generated map of the interior of the trailer;
determining whether a respective mapped 3D image data point corresponds to a respective first voxel; and
responsive to determining that the respective mapped 3D image data point corresponds to the respective first voxel, adding the respective mapped 3D image data point to the set of 3D points.

3. The method of claim 1, wherein determining whether the object is non-conforming comprises one of:
matching a first template indicative of the set of 3D points and a second template indicative of at least one non-conforming object;
processing dimension data of the object; and
utilizing a trained model to classify the object as non-conforming.

4. The method of claim 1, wherein, responsive to determining that the object is non-conforming, determining second voxels associated with unusable space proximate to the non-conforming object from among the first voxels comprises one of utilizing one or more parameters associated with a non-conforming object template and denoting the vertical and horizontal space around the non-conforming object as unusable.

5. The method of claim 1, wherein
the first voxels are indicative of an empty state;
the second voxels are indicative of a reserved state; and
the third voxels and the fourth voxels are indicative of an occupied state.

6. The method of claim 1, wherein determining the occupied portion of the trailer based on the first voxels, the third voxels, and the fourth voxels comprises:
determining a volume of each first voxel;
determining a total of each of the first voxels, the third voxels, and the fourth voxels; and
multiplying a volume of each third voxel and fourth voxel by a total of the third and fourth voxels to generate a total occupied value and dividing the total occupied value by a total of the first, third and fourth voxels.

7. The method of claim 1, wherein displaying, on the user interface, the trailer utilization for the user comprises:

generating a 3D model visualization of the trailer indicative of the trailer utilization; and
displaying, on the user interface, the 3D model visualization of the trailer for the user, wherein the 3D model visualization of the trailer includes a graphical rendering indicating a region within the trailer corresponding to the non-conforming object.

8. A system for assessing trailer utilization, comprising:
a housing;
an imaging assembly at least partially within the housing and configured to capture an image featuring a trailer;
one or more processors; and
a non-transitory computer-readable memory coupled to the imaging assembly and the one or more processors, the memory storing instructions thereon that, when executed by the one or more processors, cause the one or more processors to:
generate a map of an interior of a trailer, the map including first voxels associated with the interior of the trailer,
capture an image of the interior of the trailer, the image including a plurality of three-dimensional (3D) image data points,
iterate over each 3D image data point to generate a set of 3D points indicative of respective 3D image data points that correspond to respective first voxels,
generate a 3D map of an object based on the set of 3D points,
determine whether the object is non-conforming,
responsive to determining that the object is non-conforming, determine second voxels associated with unusable space proximate to the non-conforming object from among the first voxels and third voxels associated with the non-conforming object from among the first voxels,
responsive to determining that the object is not non-conforming, determine fourth voxels associated with the not non-conforming object from among the first voxels,
determine an occupied portion of the trailer based on the first voxels, the third voxels, and the fourth voxels,
fill at least one region associated with the non-conforming object based on dimension data of the non-conforming object,
determine trailer utilization based on the occupied portion of the trailer, the first voxels, and the second voxels, and
display, on a user interface, the trailer utilization for a user.

9. The system of claim 8, wherein the instructions, when executed, cause the one or more processor to iterate over each 3D image data point to generate a set of 3D points indicative of respective 3D image data points that correspond to respective first voxels by:
mapping each 3D image data point to the generated map of the interior of the trailer,
determining whether a respective mapped 3D image data point corresponds to a respective first voxel, and
responsive to determining that the respective mapped 3D image data point corresponds to the respective first voxel, adding the respective mapped 3D image data point to the set of 3D points.

10. The system of claim 8, wherein
the first voxels are indicative of an empty state,
the second voxels are indicative of a reserved state, and
the third voxels and the fourth voxels are indicative of an occupied state.

11. The system of claim 8, wherein the instructions, when executed, cause the one or more processor to determine the occupied portion of the trailer based on the first voxels, the third voxels, and the fourth voxels by:
  determining a volume of each first voxel;
  determining a total of each of the first voxels, the third voxels, and the fourth voxels; and
  multiplying a volume of each third voxel and fourth voxel by a total of the third and fourth voxels to generate a total occupied value and dividing the total occupied value by a total of the first, third and fourth voxels.

12. The system of claim 8, wherein the instructions, when executed, cause the one or more processors to display, on the user interface, the trailer utilization for the user by:
  generating a 3D model visualization of the trailer indicative of the trailer utilization, and
  displaying, on the user interface, the 3D model visualization of the trailer for the user, wherein the 3D model visualization of the trailer includes a graphical rendering indicating a region within the trailer corresponding to the non-conforming object.

13. A tangible machine-readable medium comprising instructions for assessing trailer utilization that, when executed, cause a machine to at least:
  generate a map of an interior of a trailer, the map including first voxels associated with the interior of the trailer;
  capture an image of the interior of the trailer, the image including a plurality of three-dimensional (3D) image data points;
  iterate over each 3D image data point to generate a set of 3D points indicative of respective 3D image data points that correspond to respective first voxels;
  generate a 3D map of an object based on the set of 3D points;
  determine whether the object is non-conforming;
  responsive to determining that the object is non-conforming, determine second voxels associated with unusable space proximate to the non-conforming object from among the first voxels and third voxels associated with the non-conforming object from among the first voxels;
  responsive to determining that the object is not non-conforming, determine fourth voxels associated with the not non-conforming object from among the first voxels;
  determine an occupied portion of the trailer based on the first voxels, the third voxels, and the fourth voxels;
  fill at least one region associated with the non-conforming object based on dimension data of the non-conforming object;
  determine trailer utilization based on the occupied portion of the trailer, the first voxels, and the second voxels;
  display, on a user interface, the trailer utilization for a user.

14. The tangible machine-readable medium of claim 13, wherein the instructions, when executed, cause the machine to iterate over each 3D image data point to generate a set of 3D points indicative of respective 3D image data points that correspond to respective first voxels by:
  mapping each 3D image data point to the generated map of the interior of the trailer,
  determining whether a respective mapped 3D image data point corresponds to a respective first voxel, and
  responsive to determining that the respective mapped 3D image data point corresponds to the respective first voxel, adding the respective mapped 3D image data point to the set of 3D points.

15. The tangible machine-readable medium of claim 13, wherein
  the first voxels are indicative of an empty state,
  the second voxels are indicative of a reserved state, and
  the third voxels and the fourth voxels are indicative of an occupied state.

16. The tangible machine-readable medium of claim 13, wherein the instructions, when executed, cause the machine to determine the occupied portion of the trailer based on the first voxels, the third voxels, and the fourth voxels by:
  determining a volume of each first voxel,
  determining a total of each of the first voxels, the third voxels, and the fourth voxels, and
  multiplying a volume of each third voxel and fourth voxel by a total of the third and fourth voxels to generate a total occupied value and dividing the total occupied value by a total of the first, third and fourth voxels.

17. The tangible machine-readable medium of claim 13, wherein the instructions, when executed, cause the machine to display, on the user interface, the trailer utilization for the user by:
  generating a 3D model visualization of the trailer indicative of the trailer utilization, and
  displaying, on the user interface, the 3D model visualization of the trailer for the user, wherein the 3D model visualization of the trailer includes a graphical rendering indicating a region within the trailer corresponding to the non-conforming object.

* * * * *